(12) United States Patent
Haller et al.

(10) Patent No.: US 11,488,495 B2
(45) Date of Patent: Nov. 1, 2022

(54) PATIENT SIMULATOR

(71) Applicant: SIMCHARACTERS GMBH, Vienna (AT)

(72) Inventors: Michael Haller, Vienna (AT); Jens Christian Schwindt, Pressbaum Bei Wien (AT); Bernhard Ehn, Erdberg (AT); Harold Jagos, Vienna (AT)

(73) Assignee: SIMCHARACTERS GMBH, Vienna (AT)

( * ) Notice: Subject to any disclaimer, the term of this patent is extended or adjusted under 35 U.S.C. 154(b) by 273 days.

(21) Appl. No.: 16/624,110

(22) PCT Filed: Jun. 26, 2018

(86) PCT No.: PCT/AT2018/000060
§ 371 (c)(1),
(2) Date: Dec. 18, 2019

(87) PCT Pub. No.: WO2019/000002
PCT Pub. Date: Jan. 3, 2019

(65) Prior Publication Data
US 2020/0211421 A1 Jul. 2, 2020

(30) Foreign Application Priority Data
Jun. 28, 2017 (AT) .................. A 271/2017

(51) Int. Cl.
*G09B 23/32* (2006.01)
*G09B 23/28* (2006.01)

(52) U.S. Cl.
CPC ........... *G09B 23/32* (2013.01); *G09B 23/288* (2013.01)

(58) Field of Classification Search
CPC .............................. G09B 23/32; G09B 23/288
(Continued)

(56) References Cited

U.S. PATENT DOCUMENTS

| 2006/0100820 A1* | 5/2006 | Davidson | G01B 21/22 |
| | | | 702/151 |
| 2010/0221689 A1* | 9/2010 | Gomo | G09B 23/30 |
| | | | 434/262 |

(Continued)

FOREIGN PATENT DOCUMENTS

| CN | 203102722 U | 7/2013 |
| EP | 2276014 A1 | 1/2011 |

(Continued)

OTHER PUBLICATIONS

"Sakamoto Airway Management Trainer," https://web.archive.org/web/20150715063652/https://www.sakamoto-model.com/product/emergency/m167/, Jul. 15, 2015 (Year: 2015).*

(Continued)

*Primary Examiner* — Kesha Frisby
(74) *Attorney, Agent, or Firm* — Pillsbury Winthrop Shaw Pittman, LLP

(57) ABSTRACT

In a patient simulator in particular premature infant, newborn or infant simulator, comprising a thorax replication, which comprises a chest replication with at least one liftable and lowerable chest element for simulating a lifting and lowering of the thorax, abdominal wall mechanics, which comprise an abdominal wall replication with at least one liftable and lowerable abdominal wall element for simulating a lifting and lowering of the abdominal wall, a lung simulator, an anatomical trachea replication opening out into a cavity, an anatomical oesophagus replication opening out into a cavity and a control unit, the patient simulator includes at least one sensor whose sensor data is transmitted to the control unit to determine whether the ventilation gas supplied to the patient simulator is conducted into the trachea replication or into the oesophagus replication.

15 Claims, 2 Drawing Sheets

Figure 1:
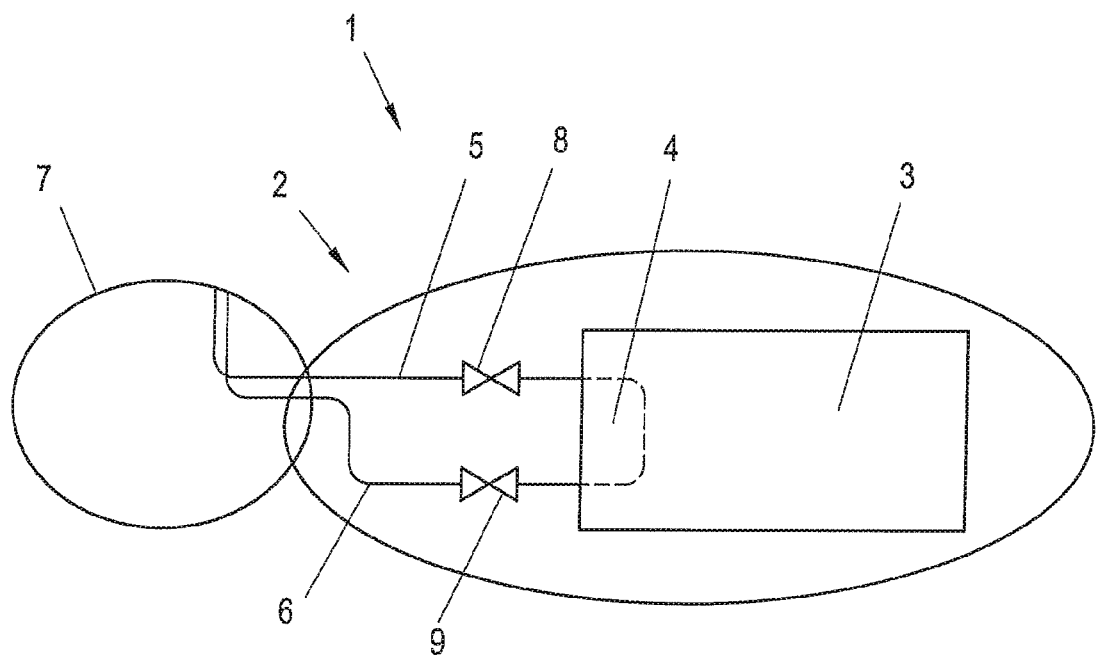

(58) Field of Classification Search
USPC .......................................................... 434/267
See application file for complete search history.

(56) References Cited

U.S. PATENT DOCUMENTS

| 2010/0304347 A1* | 12/2010 | Eggert | G09B 23/281 |
| | | | 434/266 |
| 2011/0010155 A1* | 1/2011 | Takanishi | G09B 23/32 |
| | | | 703/11 |
| 2016/0372009 A1 | 12/2016 | Eggert et al. | |

FOREIGN PATENT DOCUMENTS

| JP | 05-038667 U | 5/1983 |
| JP | 2008-064824 A | 3/2008 |
| WO | 2005/032327 A2 | 4/2005 |
| WO | 2015/161337 A1 | 10/2015 |

OTHER PUBLICATIONS

"Automatic Detection of Oesophageal Intubation Based on Ventilation Pressure Waveforms Shows High Sensitivity and Specificity in Patients with Pulmonary Disease," Kalmar et al., Resuscitation, vol. 105, May 15, 2016, pp. 36-40 (Year: 2016).*
International Search Report dated Oct. 10, 2018 issued in corresponding International Patent Application No. PCT/AT2018/000060 with English translation (5 pgs.).

* cited by examiner

PATIENT SIMULATOR

CROSS-REFERENCE TO RELATED APPLICATIONS

This application is the U.S. National Stage of PCT/AT2018/000060, filed Jun. 26, 2018, which claims priority to: Austrian Patent Application No. A271/2017, filed Jun. 28, 2017, the entire contents of each of which are herein incorporated by reference in their entireties.

The invention relates to a patient simulator, in particular a premature infant, newborn or child simulator, comprising a thorax replication comprising a chest replication with at least one liftable and lowerable chest element for simulating the lifting and lowering of the thorax, abdominal wall mechanics including an abdominal wall replication with at least one liftable and lowerable abdominal wall element for simulating the lifting and lowering of the abdominal wall, a lung simulator, an anatomic trachea replication leading into a cavity, an anatomical oesophagus replication leading into a cavity, and a control unit.

Patient simulators are used for training physicians and other medical staff and generally include a replication of a body part or the entire body of a patient, wherein the replication enables training scenarios which aim at preparing the participants of the training for real medical emergencies. Conventional patient simulators present a series of functional restrictions, which have the effect that medical malpractice cannot be recognized without further ado and with the necessary level of certainty. In particular, this is problematic when it comes to the simulation of the ventilation of the simulator since an incorrect procedure could have particularly grave consequences in real-life scenarios.

There are known cases of patient simulators which have a lung simulator with which different conditions of the lungs can be simulated and which enables the training of ventilation processes. Generally, a lung simulator includes a replication of the basic mechanical respiration parameters of a person, such as, in particular, the flow resistance of the airways (resistance) and the compliance of the lungs (compliance). In the simplest case, a lung simulator includes a pneumatic series connection of resistance and compliance. The lung simulator is used for simulating various conditions of a patient's lungs, e.g. with respect to resistance and compliance, which is particularly beneficial for training the bag ventilation as well as artificial ventilation by means of a respirator. To enable an endotracheal intubation and/or ventilation of the simulator in this context, in addition to the lung simulator, the patient simulator according to the invention includes a trachea replication leading to the lung simulator as well as, preferably, an anatomical larynx replication and an oesophagus replication.

Since the supply of a critically ill premature infant or newborn is a relatively rare event, quick, deliberate and structured actions of the medical staff are required. Therefore, problems with the implementation of the medical actions and the cooperation within the team occur frequently. If, when it comes to the supply of a premature infant or newborn whose life is at risk, incorrect measures are taken, this can have a life-long impact on the further development of the child. Especially in paediatrics, therefore, the implementation of simulation trainings is an ethical obligation. This is the only way to ensure that the necessary experience and skills for the care for critically ill premature infants or newborns can be obtained without threatening the life or the health of patients. The high level of quality required in today's medicine demands that even rare events are trained, in order to be able to save lives and to improve the quality of life after an emergency situation.

In particular, the ventilation of premature infants or newborns is extremely difficult in some cases. Here, the ventilation is used for the support or the replacement of insufficient or a lack of spontaneous breathing.

On the one hand, for ventilation, a bag valve mask, which includes a facial mask to be put over the mouth and nose of the patient, and an elastic, compressible bag including a valve directing the air flow, which is connected to that mask, can be used.

On the other hand, in anaesthesiology and intensive care, respirators, which ensure a satisfactory mechanical ventilation if the airways of the patient are kept open by means of a ventilation hose or if there is an unobstructed airflow into and from the lungs, can be used by routine.

Measures for securing the airways depend on the patient's individual situation. Endotracheal intubation offers the most effective protection. In the event of endotracheal intubation, an endotracheal tube is inserted into the trachea from the mouth, for instance.

The effectiveness of bag ventilation depends on the swiveling angle, i.e. the degree of flexion and extension of the neck. If the swiveling angle is too small or too large, i.e. the head is not sufficiently inclined backwards or excessively extended to the front, the air which has been introduced via the ventilation bag tends to increasingly enter the stomach instead of the lungs.

In the event of ventilation by means of an endotracheal tube and automatic respirators, it may be the case that the tube is inserted into the oesophagus instead of the trachea. In this case, the air introduced by the respirator also enters the stomach instead of the lungs.

Such medical malpractice is to be avoided at all costs and, therefore, it is of great interest to provide a possibility of training various ventilation scenarios on infant and newborn simulators.

Due to their small size and the related miniaturisation of technology and the control elements, the currently available infant and newborn simulators do not enable the real-life simulation of a ventilation with simultaneous simulation of the effects occurring in the event of medical malpractice. Therefore, the actions trained on the simulator do not automatically improve the actions in reality.

Consequently, the invention intends to improve a patient simulator, in particular a newborn simulator, by optimizing the realistic representation and enabling the simulation of various ventilation scenarios, even with a miniature version for premature infant simulation.

To solve this task, according to the invention stipulates the patient simulator comprises of at least one sensor whose sensor data is forwarded to the control unit in order to detect if the respiratory gas supplied to the patient simulator is guided into the trachea replication or into the oesophagus replication. By doing so, the patient simulator is able to monitor the correctness and/or effectiveness of the implemented ventilation, while the sensor data transferred to the control unit is evaluated and the simulator is able to react realistically according to the corresponding sensor data reflecting the implemented ventilation. In particular, depending on the detected ventilation and its correctness and/or effectiveness, the control unit can control the simulation of physiological reactions of the body, for instance, in the event of correct ventilation, a lifting and lowering of the thorax and, in the event of incorrect ventilation, an almost complete lack of thorax activity and, if applicable, a lifting of the abdominal wall.

With respect to the design and arrangement of the at least one sensor, the patient simulator according to the invention is more advantageously further developed in that it comprises a larynx replication and that the at least one sensor is located in said larynx replication. The arrangement of the sensor in the larynx replication of the simulator guarantees that ventilation is detected directly in the relevant location, i.e. where the tube is inserted. Additionally, the larynx replication provides sufficient space for attaching at least one sensor.

The patient simulator according to the invention can also be designed in a way that the at least one sensor is located in or at the anatomical trachea replication or the anatomical oesophagus replication. Similarly, these alternative arrangement options of the sensor serve for directly detecting the ventilation.

The patient simulator according to the invention is advantageously further developed in that the patient simulator provides several sensors, preferably at least two sensors.

The patient simulator according to the invention is advantageously further developed in that the at least one sensor, which is located in the area of the larynx replication or in the area of the trachea replication and/or the oesophagus replication, is a proximity sensor, wherein in the event of two separate sensors, both the trachea replication as well as the oesophagus replication can be assigned their own proximity sensor. This preferred embodiment serves the purpose of simulating the effectiveness of the ventilation state by means of an endotracheal tube with bag ventilation or mechanical ventilation. As mentioned above, the effectiveness of ventilation devices depends on whether the airways are kept open and/or protected, which can be ensured by means of an endotracheal tube. If the endotracheal tube is inserted into the oesophagus instead of the trachea, this leads to incorrect ventilation, whereby in such case the air, which is inserted during ventilation, enters the abdominal area instead of the lungs. By means of at least one proximity sensor, it can be easily detected whether an endotracheal tube has been introduced into the trachea or into the oesophagus. The at least one proximity sensor can, e.g., be formed as capacitive, inductive, magnetic or optical proximity sensor.

The patient simulator according to the invention is advantageously further developed in that a head replication, which is connected to the thorax replication in a swiveling manner, and an additional sensor, which is designed such that the swiveling angle of the head replication can be determined relative to the thorax replication, are provided. This preferred embodiment enables to determine the ventilation status with bag ventilation and to simulate the corresponding physiological consequences. As mentioned above, the effectiveness of the bag ventilation depends on the inclination of the neck, i.e. the swiveling angle of the head replication in relation to the thorax replication. If an insufficient swiveling angle is selected, i.e. if the head replication is not sufficiently inclined backwards in relation to the thorax replication, and/or if an excessive swiveling angle is selected, i.e. if the head replication is excessively inclined backwards in relation to the thorax replication and/or extended excessively, problems with ventilation are caused, which are recognized by the simulator by detecting that the head replication of the simulator has an incorrect swiveling angle in relation to the thorax replication.

The patient simulator according to the invention is advantageously further developed in that the additional sensor is an acceleration and/or movement sensor, in particular an inertial measurement unit, located in the head replication. The sensors mentioned above are all suitable for detecting the swiveling angle of the head replication in relation to the thorax replication. In particular, an acceleration sensor and/or an inertial measurement unit (IMU) measures the triaxial acceleration, whereby the swiveling occurring during the movement of the head replication is detected and the current relative angle of the head replication towards the thorax replication can be calculated. The relative angle determines the proportion of air, which enters the lungs, and the proportion of air, which enters the stomach. In this context, the control unit comprises of a stored algorithm, which calculates the proportion of air passing through the oesophagus and the trachea depending on the relative angle, whereby the control unit is able to actuate the simulation of the corresponding physiological reactions of the body, such as a lifting and lowering of the thorax and/or a lifting of the abdominal wall.

As mentioned above, both the trachea replication as well as the oesophagus replication open out into a cavity, which can be equipped with pressure sensors, for instance, to determine the pressure occurring in the lungs during ventilation or in the stomach in the event of incorrect ventilation and thus to measure the effectiveness of ventilation. The cavity is also used for representing the pressure conditions in the lungs or in the stomach, whereby, for instance, an increased pressure during ventilation becomes noticeable as pressure resistance. In this context, the patient simulator according to the invention is advantageously further developed in that the cavity into which the trachea replication opens out and, if applicable, the cavity into which the oesophagus replication opens out, are located in the lung simulator. This enables a particularly space-saving embodiment since, due to the arrangement of the cavity and/or the cavities in the lung simulator, a stomach simulator comprising of its own cavity or another cavity located somewhere else inside or outside of the simulator is not necessary. Hence, the simulation of various ventilation scenarios can be achieved even with a miniature version for premature infant simulation.

The patient simulator according to the invention is advantageously further developed in that the cavity into which the trachea replication opens out and the cavity into which the oesophagus replication opens out are formed by the same cavity of the lung simulator. Because of the single cavity located in the lung simulator into which both the trachea replication as well as the oesophagus replication open out, further space savings and thus a particular miniature design of the simulator are enabled.

The patient simulator according to the invention is advantageously further developed in that an initial blocking element for blocking or releasing the gas flow via the trachea replication into the cavity of the lung simulator and a second blocking element for blocking or releasing the gas flow via the oesophagus replication into the cavity of the lung simulator are provided, whereby the first and the second blocking element are arranged such that they can be activated by the control unit. The blocking elements are used to suitably control the gas and/or air flow both into the trachea replication as well as into the oesophagus replication in the event of a single cavity to prevent that the air conducted through the trachea replication into the cavity escapes through the oesophagus replication and, vice versa, that the air conducted through the oesophagus replication into the cavity escapes through the trachea replication. In the event of escaping air, the pressure conditions in the cavity would change.

Here, the patient simulator according to the invention is preferably further developed in a way that the control unit interacts with the first and the second blocking element such that the first blocking element is closed and the second blocking element is opened or remains open, if it is detected that the ventilation gas supplied to the patient simulator enters the oesophagus replication.

The patient simulator according to the invention is preferably further developed in a way that the control unit interacts with the first and the second blocking element such that the second blocking element is closed and the first blocking element is opened or remains open, if it is detected that the ventilation gas supplied to the patient simulator enters the trachea replication.

The information detected by the respective sensor is forwarded to the control unit, which, in turn—depending on whether a correct ventilation via the trachea replication or an incorrect air supply into the oesophagus replication is given—activates the corresponding blocking element.

If the head replication is excessively or insufficiently inclined in relation to the thorax replication of the simulator and/or if the tube was incorrectly introduced into the oesophagus replication and the ventilation gas supplied to the simulator thus enters the oesophagus replication, the control unit interacts with the first and the second blocking element in a way that the first blocking element is closed and the second blocking element is opened and, thus, only a ventilation of the stomach and no ventilation of the lungs are simulated.

On the other hand, if the head replication shows the correct inclination angle in relation to the thorax replication of the simulator and/or if the tube was correctly introduced into the trachea replication and the ventilation gas supplied to the simulator thus enters the trachea replication, the control unit interacts with the first and the second blocking element in a way that the second blocking element is closed and the first blocking element is opened or remains open and, thus, a ventilation of the lungs and no ventilation of the stomach are simulated.

A valve can be used as blocking element, for instance.

The patient simulator is advantageously further developed in that a lifting and lowering drive, which can be activated independently of the lung simulator, is provided for the at least one liftable and lowerable chest element. Due to the fact that the lifting and lowering of the chest element are not mechanically coupled to the expansion or emptying of the lung cavity replication but are controlled independently, the option of using the cavity of the lung simulators for the simulation of an incorrect ventilation during which the air is conducted into the stomach, as described above, is provided.

Generally, because of the mentioned independence of the actuation of the thorax element, it is possible to design the lung simulator and the simulation of the lifting and lowering of the thorax as functionally separate units, which can be actuated separately for implementing simulation processes.

The patient simulator according to the invention is preferably further developed in a way that the control unit interacts with the lifting and lowering drive for the at least one liftable and lowerable chest element and with a lifting and lowering drive for the liftable and lowerable abdominal wall element. Therefore, depending on whether a correct or an incorrect ventilation was detected, the control unit can activate the thorax element or the abdominal wall element.

In this context, a preferred embodiment of the invention provides a control unit, which is designed in a way that it can activate the drive of the liftable and lowerable abdominal wall element for lifting the abdominal wall element if it is detected that the ventilation gas supplied to the patient simulator enters the oesophagus replication. By doing so, it is possible to depict the anatomically correct condition in the event of incorrect ventilation.

The patient simulator according to the invention is advantageously further developed in that the control unit is designed in a way that it can control the lifting of the abdominal wall element depending on the swiveling angle of the head replication relatively to the thorax replication.

The patient simulator according to the invention is preferably further developed in that at least one sensor for measuring the condition of the lung simulator, in particular at least one pressure sensor for measuring the pressure in the cavity of the lung simulator, is provided and that the signals of such sensor are transmitted to the control unit for activating the lifting and lowering drive for the at least one liftable and lowerable chest element to lift and lower the at least one liftable and lowerable chest element depending on the signals if it is detected that the ventilation gas supplied to the patient simulator enters the trachea replication, wherein the pressure sensor is preferably located and designed in a way that it determines the ventilation pressure.

For simulating physiologically normal conditions of the respiratory system, in particular of the lungs, when detecting a correct ventilation, the lifting and lowering mechanics of the thorax replication are controlled in a way that the at least one liftable and lowerable chest element is lifted and lowered synchronously to the filling with air and emptying of the lung simulator. This is especially the case when carrying out ventilation exercises with the patient simulator.

For this purpose, the lung simulator can preferably comprise of two cavities, one for simulating the right lung and one for simulating the left lung, which can both be filled with air from a respirator via the trachea replication, whereby pressure sensors for measuring the pressure in the cavity and/or cavities are provided. The signals of the pressure sensor(s) are preferably transferred to the control unit for activating the lifting and lowering mechanism of the thorax replication to lift and lower the at least one liftable and lowerable chest element depending on the pressure signals. The pressure sensors are preferably arranged and designed in a way that the ventilation pressure and the ventilation volume can be determined. For this purpose, the at least one cavity of the lung simulator is preferable arranged in a way that the volume can be adjusted. The volume can be dynamically adjusted according to the basic physical principles of compliance and resistance. The calculation of the current volume is based for instance on an adapted algorithm within a micro-controller. For setting the physiological and pathological respiration parameters of the lung simulator, preferably, an electric drive is provided.

The patient simulator according to the invention is preferably further developed in that the lung simulator comprises at least one control member for setting the compliance and/or at least one control member for setting the resistance wherein, preferably, the control unit interacts with the control member for setting the compliance such that a reduction in the compliance of the lung is simulated if the lifting and lowering drive for the liftable and lowerable abdominal wall element is activated for lifting the abdominal wall element. By doing so, in the event of an incorrect ventilation into the stomach, in addition to the lifting of the abdominal wall, a bloating of the stomach causing pressure onto the lungs can be simulated, which leads to a consequential compression of the lungs.

Here, the replication of the lung can be formed by a chamber with a controllable piston, which is able to change the replicated lung volume depending on pressure and time, wherein, by changing pressurization of the piston, both the resistance as well as the compliance can be set.

The invention is discussed in more detail below with reference to exemplary embodiments schematically shown in the drawing.

Figure 3:
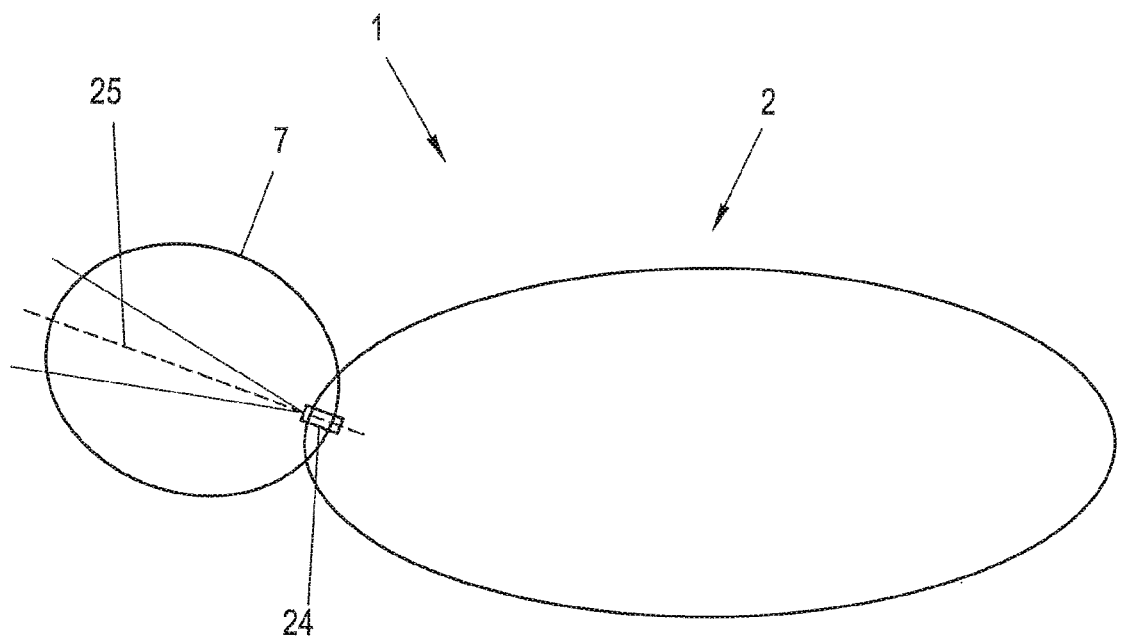
Figure 2:
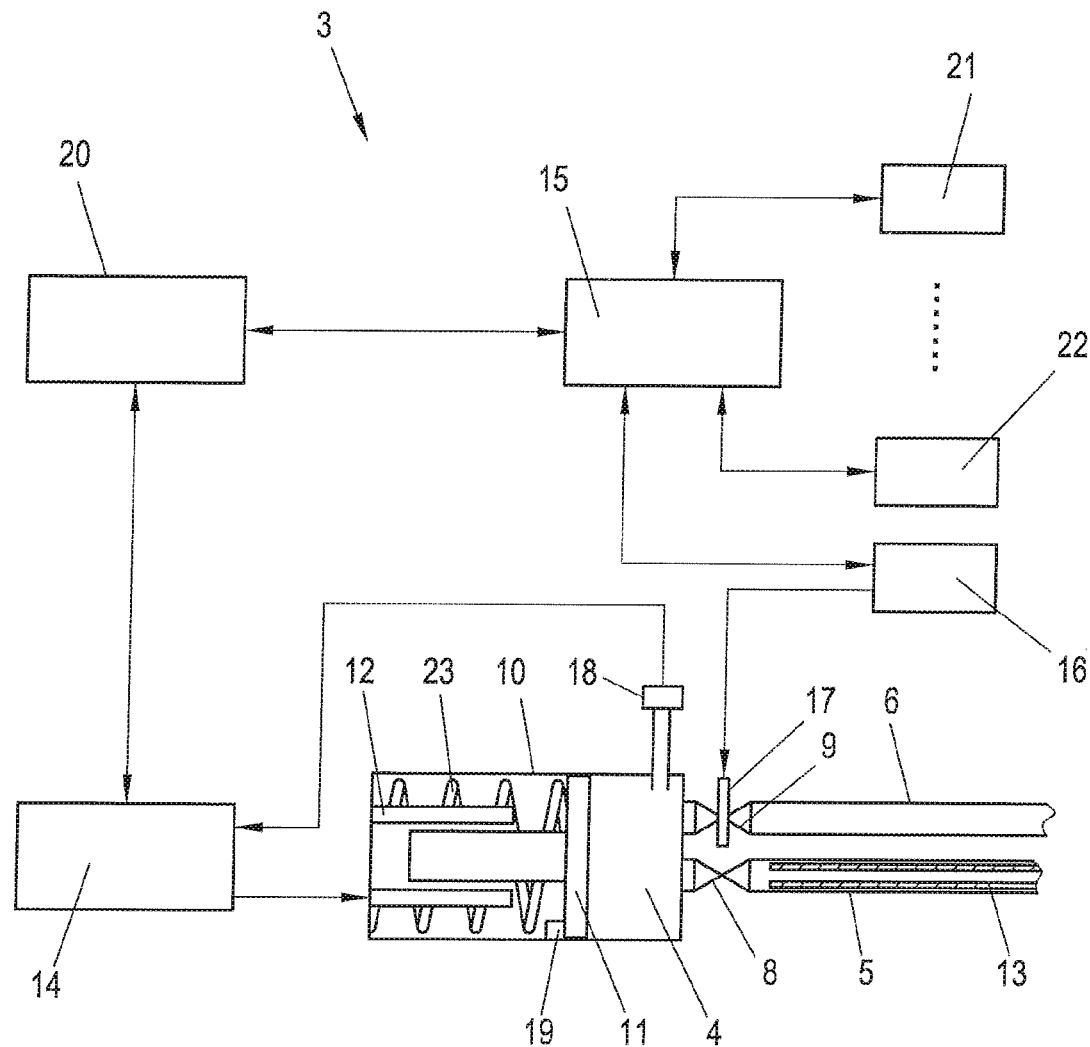

FIG. 1 displays a cross-sectional view of the patient simulator according to the invention, FIG. 2 displays a flow diagram of the control unit of the lung simulator with separately activatable lifting and lowering mechanics of the chest replication and FIG. 3 shows another cross-sectional view of the patient simulator according to the invention.

FIG. 1 depicts the patient simulator 1 according to the invention which includes a thorax replication 2 comprising of a chest replication with at least one liftable and lowerable chest element (not displayed in FIG. 1) for simulating the lifting and lowering of the thorax, abdominal wall mechanics (not displayed in FIG. 1) comprising an abdominal wall replication with at least one liftable and lowerable abdominal wall element for simulating the lifting and lowering of the abdominal wall, a lung simulator 3, an anatomical trachea replication 5 opening out into the cavity 4 of the lung simulator 3, and an anatomical oesophagus replication 6 opening out into the same cavity 4 of the lung simulator 3. Additionally, the simulator includes a swiveling head replication 7 connected to the thorax replication 2 as well as a first blocking element 8 for blocking or releasing the gas flow via the trachea replication 5 into the cavity 4 of the lung simulator and a second blocking element 9 for blocking or releasing the gas flow via the oesophagus replication 6 into the cavity 4 of the lung simulator 3.

FIG. 2 displays a flow diagram of the control unit of the lung simulator with separately activatable lifting and lowering mechanics of the chest replication.

In this preferred embodiment, the lung simulator 3 comprises a rigid-wall, preferably metallic cylinder 10, in which a piston 11, which can be adjusted in an axial direction by means of a drive 12 (e.g. stepper motor), is located. The piston 11 restricts a working volume and/or a cavity 4 of the lung simulator 3, into which the replication of a trachea 3 and of an oesophagus open out. A tube 13 can be inserted into both the trachea and the oesophagus (FIG. 2 shows the condition with the tube inserted into the trachea). At the transition of the trachea 5 and the oesophagus 6 into the cavity 4, a first blocking element 8 for blocking or releasing the gas flow via the trachea replication 5 into the cavity 4 of the lung simulator 3 and a second blocking element 9 for blocking or releasing the gas flow via the oesophagus replication 6 into the cavity 4 of the lung simulator are located.

Sensors (not displayed in FIG. 2) in the larynx replication (not displayed in FIG. 2) recognise whether or not the tube 13 is correctly inserted into the trachea replication 5 or is incorrectly inserted into the oesophagus replication 6. In interaction with the computer-supported control unit 14 and, in the further course, with the animation control unit 15, a motor 16 is activated. The motor 16 moves an interlock 17 in a way that, in the event of ventilation via the trachea replication 5, in which the tube 13 is located, the blocking element 8 opens and the blocking element 9 closes. The air is thus conducted via the trachea replication 5 into the cavity 4 of the lung simulator 3.

Furthermore, in FIG. 2, a pressure sensor 18 with pressure relief valve (not displayed in FIG. 2) for limiting the maximum admissible pressure, which is used for measuring the pressure in the cavity 4, which in turn is transmitted to the control unit 14, is displayed. With the physiological calculation model 20, thus, information with respect to compliance and resistance can be calculated and/or, vice versa, from an indicated compliance value and an indicated resistance value, corresponding values for pressure, volume flow and volume can be calculated.

The physiological calculation model 20 is designed in a way that the current filling volume can be defined based on the values for compliance, resistance and respiration pathologies (e.g. inverted breathing) and, additionally, the position data for the current position of the thorax replication and the abdominal wall, which is transmitted to the animation control unit 15, can be generated. In the animation control unit 15, this data is used to generate control signals for the lifting and lowering mechanics 21 interacting with the thorax replication and for the lifting and lowering mechanics 22 interacting with the abdominal wall so that the simulation of the breathing movements is synchronous and in accordance with the simulation condition of the lung simulator 3.

In the metallic cylinder 10, additionally, a spring 23, e.g. a preload spring is located, which keeps the piston 11 in a basic position and ensures basic compliance.

FIG. 3 displays a cross-sectional view of the patient simulator 1 according to the invention including a head replication 7, which is connected to the thorax replication 2 in a swiveling manner, and a larynx replication 24, in which a sensor for determining the swiveling angle of the head replication 7 to the thorax replication 2 is located.

In FIG. 3, the swiveling angle (dashed line 25) of the head replication 7 in relation to the thorax replication 2 amounts to approximately 20°.

The invention claimed is:

1. A patient simulator comprising:
a thorax replication, which comprises a chest replication with at least one liftable and lowerable chest element for simulating a lifting and lowering of the thorax replication,
abdominal wall mechanics, which comprise an abdominal wall replication with at least one liftable and lowerable abdominal wall element for simulating a lifting and lowering of the abdominal wall replication,
a lung simulator,
an anatomical trachea replication opening out into a trachea cavity,
an anatomical esophagus replication opening out into an esophagus cavity, and
a control unit,
characterized in that the patient simulator includes at least one sensor whose sensor data is transmitted to the control unit to determine whether ventilation gas supplied to the patient simulator is conducted into the trachea replication or into the esophagus replication,
wherein a first lifting and lowering drive, which can be activated independently of the lung simulator by the control unit, is provided for the at least one liftable and lowerable chest element,
wherein the control unit interacts with the first lifting and lowering drive for the at least one liftable and lowerable chest element and with a second lifting and lowering drive for the at least one liftable and lowerable abdominal wall element and the control unit is designed to actuate the second lifting and lowering drive for lifting the at least one liftable and lowerable abdominal wall element upon detection that the ventilation gas supplied to the patient simulator enters the esophagus replication.

2. The patient simulator according to claim 1, characterized in that the patient simulator comprises a larynx replication and that the at least one sensor is located in the larynx replication.

3. The patient simulator according to claim 1, characterized in that the at least one sensor is located in or at the anatomical trachea replication or the anatomical esophagus replication.

4. The patient simulator according to claim 1, characterized in that the patient simulator comprises at least two sensors.

5. The patient simulator according to claim 1, further comprising a head replication, which is connected to the thorax replication in an inclining manner, and an additional sensor, wherein the additional sensor is designed such that it detects an angle of inclination of the head replication relative to the thorax replication.

6. The patient simulator according to claim 5, characterized in that the additional sensor is located in the head replication, and wherein the additional sensor is an acceleration sensor, and/or movement sensor.

7. The patient simulator according to claim 5, characterized in that the control unit is designed such that it can control the lifting of the abdominal wall element depending on the angle of inclination of the head replication relative to the thorax replication.

8. The patient simulator according to claim 1, characterized in that the at least one sensor is a proximity sensor located in the area of the larynx replication or in the area of the trachea replication or in the esophagus replication.

9. The patient simulator according to claim 1, characterized in that the trachea cavity into which the trachea replication opens out and the esophagus cavity into which the esophagus replication opens out are located in the lung simulator.

10. The patient simulator according to claim 9, characterized in that the trachea cavity into which the trachea replication opens out and the esophagus cavity into which the esophagus replication opens out are formed by the same cavity of the lung simulator.

11. The patient simulator according to claim 9, characterized in that a first blocking element for blocking or releasing gas flow via the trachea replication into the trachea cavity of the lung simulator and a second blocking element for blocking or releasing gas flow via the esophagus replication into the esophagus cavity of the lung simulator are provided, wherein the first and the second blocking elements are arranged in a way for activation by the control unit.

12. The patient simulator according to claim 11, characterized in that the control unit interacts with the first and the second blocking elements such that the first blocking element is closed and the second blocking element is opened or remains open if it is detected that the ventilation gas supplied to the patient simulator enters the esophagus replication.

13. The patient simulator according to claim 11, characterized in that the control unit interacts with the first and the second blocking elements such that the second blocking element is closed and the first blocking element is opened or remains open if it is detected that the ventilation gas supplied to the patient simulator enters the trachea replication.

14. The patient simulator according to claim 9, characterized in that the at least one sensor comprises at least one pressure sensor for measuring pressure in the trachea and oesophagus cavities of the lung simulator is provided and that signals of the at least one pressure sensor are transmitted to the control unit for activating the first lifting and lowering drive for the at least one liftable and lowerable chest element to lift and lower the at least one liftable and lowerable chest element based on the signals upon detection that the ventilation gas supplied to the patient simulator enters the trachea replication, wherein the at least one pressure sensor is configured to determine a ventilation pressure.

15. The patient simulator according to claim 1, characterized in that the lung simulator comprises at least one control member for setting a compliance and/or at least one control member for setting a resistance wherein the control unit interacts with the control member for setting the compliance such that a reduction in the compliance of the lung is simulated if the second lifting and lowering drive for the liftable and lowerable abdominal wall element is activated for lifting the abdominal wall element when the control member for setting the compliance is present.

* * * * *